Dec. 7, 1937.  H. P. LUHN  2,101,260
APPARATUS FOR DETERMINING VARIATIONS IN THICKNESS OF THREAD
Filed Feb. 19, 1935  3 Sheets-Sheet 1
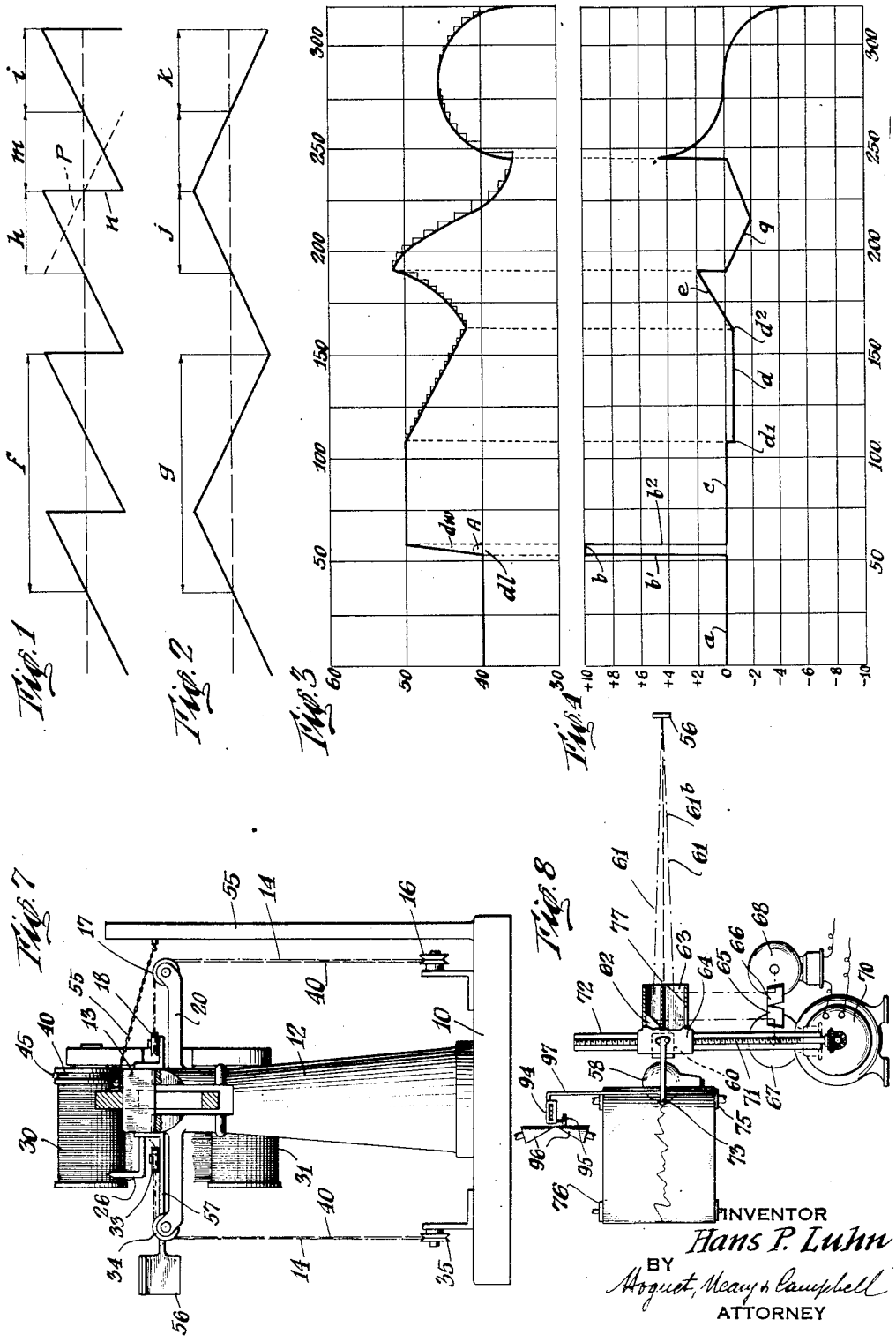
INVENTOR
Hans P. Luhn
BY
Hoguet, Neary & Campbell
ATTORNEY

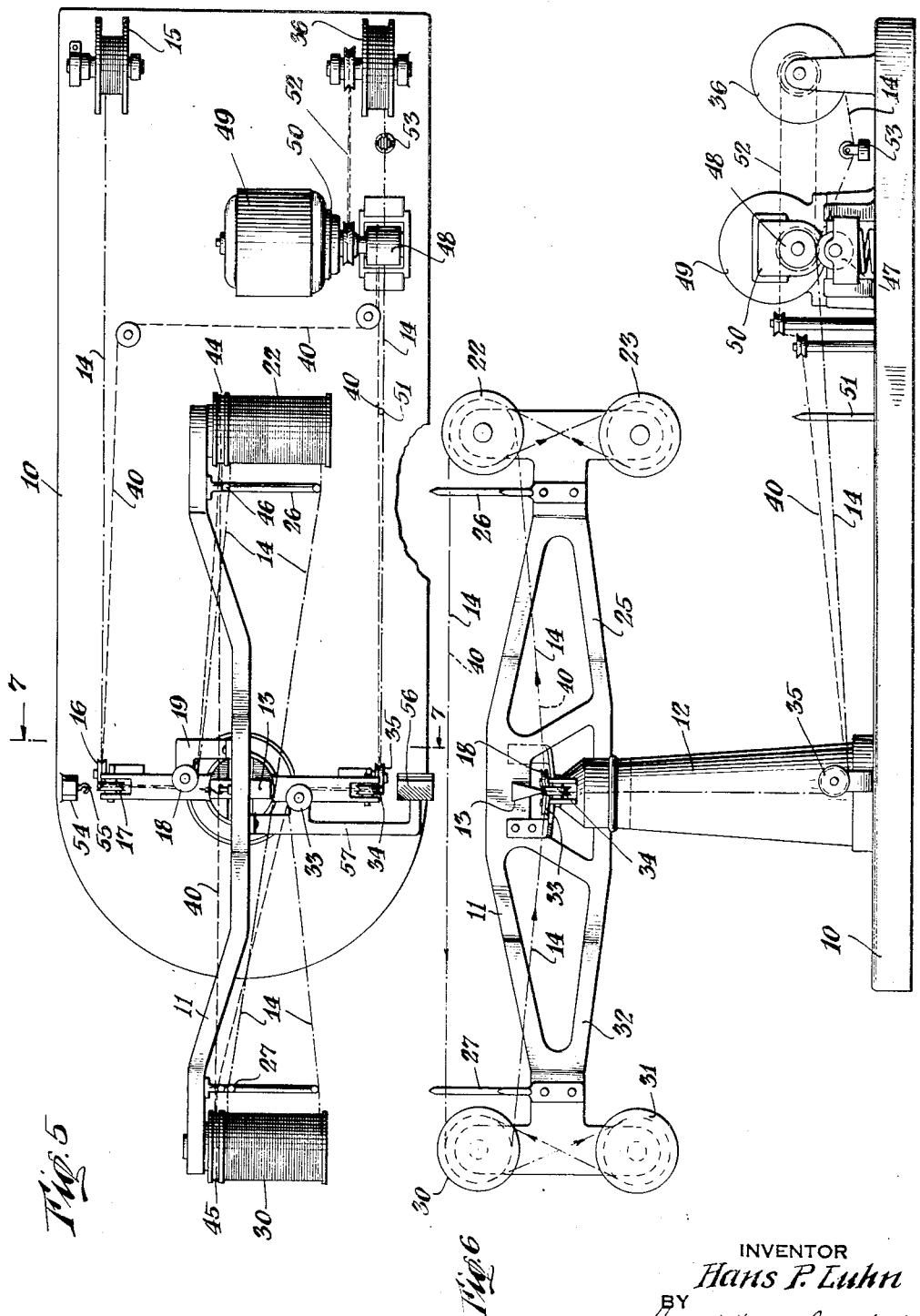

Dec. 7, 1937.  H. P. LUHN  2,101,260
APPARATUS FOR DETERMINING VARIATIONS IN THICKNESS OF THREAD
Filed Feb. 19, 1935  3 Sheets-Sheet 3
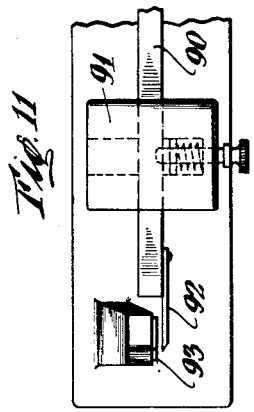
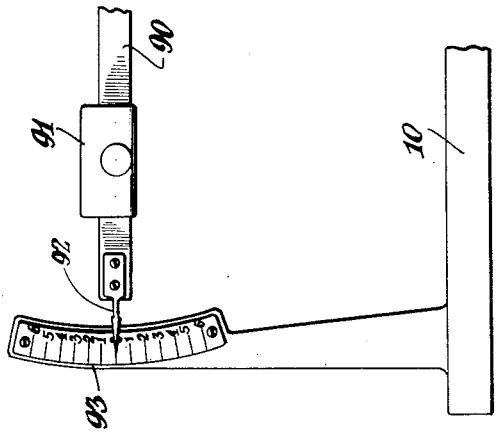
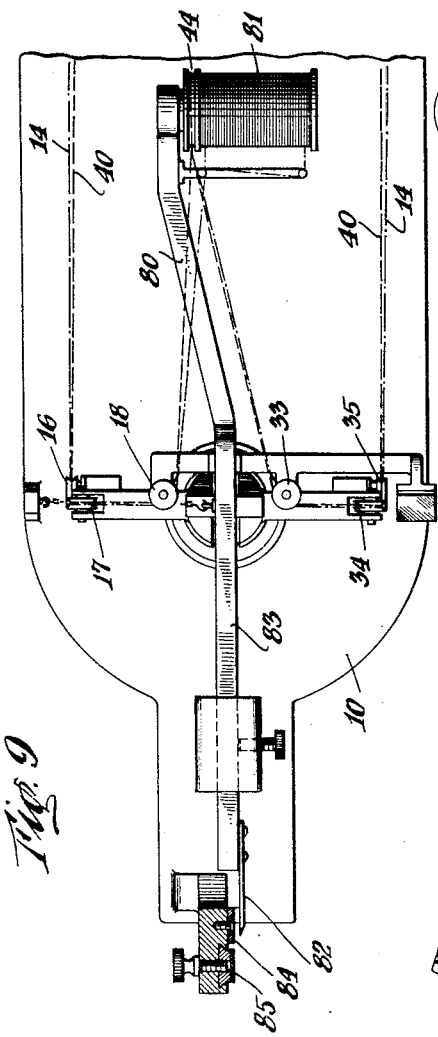
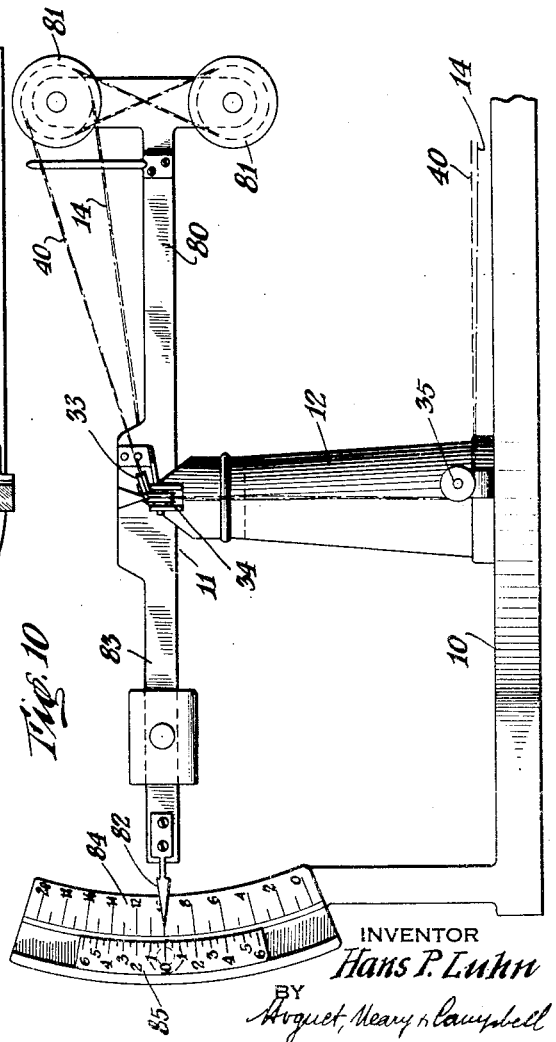
INVENTOR
Hans P. Luhn
BY
Arquet, Meary & Campbell
ATTORNEYS Patented Dec. 7, 1937

2,101,260

UNITED STATES PATENT OFFICE 2,101,260

APPARATUS FOR DETERMINING VARIATIONS IN THICKNESS OF THREAD

Hans P. Luhn, New York, N. Y.

Application February 19, 1935, Serial No. 7,304

11 Claims. (Cl. 265—27)

This invention relates to apparatus for testing thread or the like and particularly to apparatus for determining variations in thickness of thread.

In a fabric formed from thread, changes in the weight or strength of the latter are of secondary importance as variations in either would not be pronounced enough to influence the corresponding properties of the fabric because such variations over a number of small areas average up so as not to be of serious consequence. On the other hand, unevenness or variations in the thickness of the thread are objectionable because the appearance of the fabric, especially when made of silk thread, is of utmost importance since the finer the fabric is the more noticeable will be variations of thread thickness.

Consequently, one of the most favored tests for thread has been the visual test for determining variation in thickness as carried out in conjunction with the serigraph. However, because this visual method is dependent upon the human element, it is impossible to obtain uniform results. The values attributed to thread on inspection thereof by different persons conducting the tests, instead of being uniform are apt to vary in accordance with their individual judgment; and even when only one person conducts the tests he may reach different conclusions at different times due to changes in his physical condition, particularly that of his eyes. Moreover, this visual method of testing thread for variations in thickness, while accurately revealing sudden and highly objectionable variations in thickness, is apt to fail to indicate gradual changes in thickness which may also be objectionable, although to a lesser degee. Accordingly, although the visual test method is extensively used and has many advantages, it is desirable to provide a more accurate method of testing in order to obtain more uniform and satisfactory results.

A second object of the present invention is to provide a testing apparatus by which variations in the thickness of thread may be determined automatically.

A third object is to provide apparatus for testing thread involving a system of classification based on definite values.

A fourth object is to provide apparatus for testing thread in which uniform results are attained when the test is repeated or if it is carried out by different persons.

Another object is to provide a testing apparatus in which the tested thread is preserved intact, that is, in which portions thereof are not consumed or destroyed as in many processes and apparatus for testing various materials.

Still another object is to provide a thread testing apparatus by which the test may be carried out rapidly.

A further object is to provide a means for automatically recording the results of the test.

Other objects and advantages of the invention will become apparent upon consideration of the following description and appended claims when read in conjunction with the accompanying drawings, in which:

Figure 1 is a graph representing a thread of determined length which varies in thickness at a number of points; the amount of variation being the same in each instance;

Figure 2 is a graph representing a thread of the same length and the same average diameter as that represented in Figure 1 but in which the variations in thickness are more gradual and less frequent in occurrence;

Figure 3 is a synthetic graph representing various types of changes in thickness that may occur in a thread;

Figure 4 is a graph in which the variations in thread thickness represented in Figure 3 are translated and plotted in terms of the extent and rate of change of the variations in thickness;

Figure 5 is a top plan view of apparatus for determining variations in the thickness of thread in accordance with the present invention;

Figure 6 is a side elevation of the apparatus shown in Figure 5;

Figure 7 is a sectional view taken along the line 7—7 in Figure 5;

Figure 8 is a diagrammatic view of recording apparatus utilized for recording variations in thread thickness as determined in accordance with the invention;

Figures 9 and 10 are fragmentary top plan and side elevational views, respectively, of another form of apparatus embodying the invention; and Figures 11 and 12 are fragmentary top plan and side elevational views, respectively, of still another form of apparatus embodying the invention.

In the serigraph test for visually inspecting thread to determine its evenness, successive portions of light colored thread are evenly spaced in side-by-side relation in front of a dark background. According to the thickness of the thread the relative spacing between the edges of adjacent thread portions is smaller or wider, letting more or less of the black background shine through. By optical illusion the panel appears to have a shade between white and black, the value of which depends on the proportion of thickness of the light thread to the dark spaces in between. The resulting shade of gray by itself would probably escape classification, inasmuch as color of silk and lighting conditions vary. However, by contrast of shades of adjoining portions of the panel, differences in thickness become apparent. The greater these differences are, the more pronounced the contrast in shades will be. But even then no definite value in terms of absolute thickness of thread can be attributed to any of the shades as they appear on the panel. All that can be decided by visual examination of the combination of shades is that there exist more or less pronounced changes of thickness. From the number of such occurrences, their extent and their severity, the examiner, guided by experience and by comparison with standard panels, decides upon the classification in percentages of evenness.

Consequently, this method, although it has a number of advantages, gives only relative values of unevenness; sudden deviations show up very prominently, while gradual changes may escape the attention of the examiner entirely, and therefore would not be considered, although the absolute value of both might be of the same order. The curves in Figures 1 and 2 represent the actual variation of thickness over a certain length of thread. Average thickness is the same in both cases, and the greatness of variations is of the same order. The thread of Figure 1, if put on a panel, would show four distinct breaks, while the thread of Figure 2 would not show any distinct contrasts, the maximum and minimum shades blending into each other gradually. The thread of Figure 2 would undoubtedly receive a higher rating than that of Figure 1, which is in accordance with standard requirements.

Thus, it is apparent that the rate of change in thickness of thread is a factor of importance. If a thread has the same thickness for a certain length, then that length obviously represents an even thread. Another piece of thread might start with a diameter of 50 microns, for exampe, and gradually and at a uniform rate become thicker so that at the end of 10 meters it reaches a diameter of 51 microns. The one characteristic this thread has in common with the first is that the rate of change is constant in both cases; it is zero in the first case and some value above zero in the second. A thread varying gradually and uniformly in thickness might be considered even for many purposes. A thread of such form might do no harm in a fabric, and even if it continued for the next 10 meters by gradually reducing from 51 to 50 microns that might not be noticeable in the fabric either; and, as discussed above, would probably escape notice in a visual test.

If, instead of gradually reducing again, the thread at the end of the first 10 meters drops suddenly back to 50 microns and then gradually increases as it did in the first 10 meters, it seems reasonable that such a condition would be noticeable due to contrast, and that the penalty for it should be commensurate. In this case, the rate of change gives definite and reliable information; the rate of change varies and while for quite a distance it was a rather moderate value of, for instance, +.2, it suddenly changes to —3.0 or more, and returns to +.2 again as soon as the "break" is over.

Following the contour of the artificial curve in Figure 3, it may be noted that the first 50 meters of thread are of the same diameter, and the rate of change for this piece, therefore, is zero. This value is recorded on the chart of Figure 4 in the form of the line "a". After the first 50 meters the thread shows a sudden increase in diameter from 40 microns to 50. The previous rate of change over 50 meters was zero and since the thread has suddenly increased from 40 to 50 microns in a relatively short length the rate of change (ratio of the difference in diameter to the length in which it takes place) has increased considerably. In particular, it may be observed that within the distance $dl$ the diameter has increased by $dw$. Measuring these two items, it is found that $dw$ is ten times as long as $dl$, and it is apparent that the proportion between these values represents the rate of change, or in other words "10" is the rate of change at this point, and this is recorded in Figure 4 as "b". After the thread has reached the thickness of 50 microns it continues at this value. Therefore, while the thread continues at an even thickness of 50 microns another sudden change occurs at this point in the rate of change, the amount being the same as before, only negative from 10 to 0, which brings the curve of Figure 4 back to the zero line as shown by "c", representing zero for the next 50 meters. For the following 50 meters the diameter of thread shrinks gradually from 50 to about 43, and determining the rate of change in the same way as before, i. e., taking the proportion between the difference of diameters and the length of thread considered, or —.5; recorded as "d" in Figure 4.

At this point it is desirable to consider what this rate of change represents, and what its relation to the form of curve is. At the end of the first 50 meters a little triangle is formed by the curve, the horizontal $dl$ and the vertical $dw$. As this triangle was one right angle, the proportion $$\frac{dw}{dl}$$

is a trigonometric function (tan) of the angle A, which the curve forms with the horizontal. Therefore, the values 0, +10, 0, —.5 are the tangents of the angles A which the curve of Figure 3 forms with the horizontal, and the curve of Figure 4 is a graph of these values "tan A". Consequently, the rate of change of the diameter curve may be determined by measuring the angle A at certain points and recording the tangent of these angles in Figure 4. Reversing the procedure, the slope of the curve of Figure 3 at certain points can be reconstructed by finding the angle A from its function tan A.

Returning to analysis of the diameter curve of Figure 3, the next piece is shown by an upward curve, indicating that at this section the diameter increases at a continuously increasing rate. This part of the curve not being a straight line cannot be considered as a whole, but will have to be sub-divided until the smaller parts can be considered practically straight. Then measurement of the angle A at the various points permits determination of the various proportions which, when recorded in Figure 4, result in an inclining straight line "e". This indicates that the value tan A increases steadily from 0 to +2. The analysis of the rest of the curve does not offer any difficulty.

The significance of the function "tan A" to the problem of determining the variation in thickness of thread may now be determined. Glancing over the curves of Figures 3 and 4, it may be seen that the more sudden a "break" is, the larger that angle A, and therefore "tan A", will be. However, A and tan A do not grow in the same proportion. For instance, if angle A is 30°, its tangent is .58; if it is double the size, or 60°, the tangent would be 1.7, or practically three times instead of double. This seems to be just what is wanted in the way of classification of thread for unevenness since penalties for unevenness of low order should be moderate, but those of higher order should be more than a proportionate value.

Having found such a convenient and appropriate expression for unevenness, all the many values may be reduced to a single term by adding up all values of tan A, (taking all negative values as positive), to get the total value of unevenness of the thread. For a given length of thread, the area between the curve of Figure 4 and the horizontal axis O would represent that value.

However, in order to make use of these values indicating the rate of change in thickness of thread in order to determine its quality for classification, it is necessary to measure the diameter of the thread, or rather, that fraction of the diameter which represents variation in thickness. As discussed above, the visual test is not suitable because it is indeterminate; measurements of thread as done with steel wire have not been very successful, and microscopic analysis would be too slow.

It can be mathematically demonstrated, and is accepted by the trade, that there is a relation between the physical thickness of thread and its weight, and that both change proportionally. Weighing is, of course, the basis of yarn classification of all denominations. For silk in particular the unit is 1 denier=0.5 gram. Referring again to Figures 1 and 2, if pieces $f$ and $g$ of equal length are cut from each thread and weighed, their weights will be the same, and on that basis no distinction in their diameters would be apparent. Two pieces $h$ and $i$ of equal length cut from the thread of Figure 1 would also be equal in the weight and their actual characteristics would not be disclosed. In the thread of Figure 2, the two pieces $j$ and $k$ are of different weight, $j$ being heavier than $k$, indicating variation. The same variation would be found between the parts $h$ and $m$ of the thread of Figure 1, which finding would tend to indicate the sudden break $n$, which it actually does. However, this finding would not necessarily indicate a break, since the condition of that part of the thread might have been such as indicated by the dotted line $p$, without having changed the result.

Consequently, it is evident that weight tests of separate parts of thread, whether taken consecutively or in any other order, can furnish only part of the information actually needed for proper classification. It is apparent that weighing separate portions of thread would fail to give a positive indication of the rate of change in thickness and that gradual changes, their extent and duration, would escape detection.

However, if the thread is weighed without cutting it into sections and the weighing operation is continuous, it becomes possible to obtain values such as those of Figure 4 which indicate the extent of change in thickness of the thread, the rate of change, and the length of thread in which the variation occurs. Figures 5 to 8 illustrate apparatus for continuously weighing an unbroken thread and for recording the extent and rate of changes in thickness.

The numeral 10 designates the base of a weighing scale having a beam 11 balancing on the standard 12 about a knife edge fulcrum 13. The thread 14 extends from a suitable supply source, such as a spool 15, around a guide roll 16 on base 10 and is directed to rolls 17, 18. Roll 17 is mounted on a support 20 fixed to standard 12 adjacent the beam 11 and roller 18 is mounted on a bracket 19 carried by the beam, both rolls being positioned so that the thread enters or comes upon the scale in a line coinciding with the axis of oscillation of the beam. From roll 18 the thread passes to the roller 22 of a pair 22, 23 rotatably mounted at or adjacent the end of the arm 25 of beam 11. A determined length of thread is accumulated on the rollers 22, 23 by passing the thread between them a number of times. The thread preferably extends between rollers 22 and 23 in figure eight form, as this arrangement results in interlacing of a number of thread reaches between the rollers so that the thread is automatically and evenly distributed axially of the rollers as it is continuously taken up at one end of roller 22 and paid out at the other end thereof.

From the accumulating roller 22 the thread is directed across the scale by guides 26, 27 to a similar pair of accumulating rollers 30, 31 correspondingly located at or adjacent the end of the other arm 32 of beam 11. A length of thread equaling and normally balancing that on rollers 22, 23 is accumulated on the rollers 30, 31 before the thread is directed around guide rolls 33, 34, located similarly to the rolls 17, 18, respectively. Thus, the thread also leaves the scale along the line of oscillation of the beam and is directed by a roller 35 to a take-up spool 36.

A band or cord 40 for driving both pairs of accumulating rollers is provided in order to relieve the thread of the tensional and other stresses that might be imposed thereon due to friction and other forces that might be encountered if the thread were drawn through the scales and itself operated the rollers. The band 40 also enters and leaves the scale along a line coinciding with the axis of oscillation of the beam, being directed round the guide rolls 16, 17, 18 with the thread 14 in entering the scale and around the guide rollers 33, 34, 35 in leaving the scale. The cord 40 passes one or more times, also preferably in figure eight form, around grooved pulleys 44, 45 secured to the several accumulating rollers for rotating the latter as the thread is drawn through the scale. A guide 46 supported on the beam separates the thread and band and guides them, respectively, to the accumulating roller 22 and pulley 44 on the arm 25. From guide roll 35, the band 40 passes between a pressure roll 47 and the band driving roll 48, which is operated by a motor 49 through reduction gearing 50. The thread also passes between the rolls 47, 48 so that both band and thread are drawn through the scale at the same rate, a guide 51 spacing the band and thread for passage between the rolls 47, 48. The thread take-up spool 36 is also driven by motor 49, through a crossed belt 52, a weight 53 or other slack take-up device being associated with the thread between rolls 47, 48 and spool 36.

To prevent lateral movement of beam 11 on standard 12 due to the force resulting from drawing the thread and band through the scale, the beam is connected adjacent its axis of oscillation with a standard 54 on base 10 by means of a light chain 55.

For the purpose of automatically recording the variations in the thickness of the thread as determined by the above described weighing device, an optically steered recording mechanism is employed. Referring also to Figure 8, a mirror 56 is supported in alignment with the axis of oscillation of the beam by a bracket 57 fixed to the arm 32 thereof. A ray of light, supplied by a stationary light source 58, is directed on the mirror 56 through a focusing device 60. The reflected ray 61 is adapted to be intercepted by one or the other of a pair of prisms 62, 63 mounted on a movable carriage 64 and directed by them against mirrors 65, 66, respectively, and by the latter to photo-electric cells 67, 68, respectively. The cells 67, 68 are arranged to operate through suitable relays for controlling the operation of a reversible motor 70 driving a screw 71 for raising or lowering the carriage 64 which is confined to an axial movement by a guide rail 72 that prevents its rotation with screw 71. The carriage 64 is provided with a pen 73, or similar recording member, adapted to trace a curve on a record sheet 74 continuously drawn from a supply roller 75 by a take-up roller 76 that is driven by a suitable motor at a rate determinedly proportional to the rate at which the thread passes over the weighing scale.

The operation is as follows: the thread to be tested is led from the supply spool 15 around the guide rolls 16, 17, 18 and wound in figure eight form on the accumulating rollers 22, 23 until a determined length, nine meters for example, is accumulated on these rollers. The thread 14 is then led across to the accumulating rollers 30, 31 and a like length similarly wound thereon, and the thread is then directed around the guide rollers 33, 34, 35 to the take up spool 36. When motor 49 is started the band 40 drives the several accumulating rollers so that thread is continuously fed onto and discharged from the scale to be taken up by the spool 36. Inasmuch as the band 40 and thread 14 enter and leave the scale along lines coinciding with the axis of oscillation of the beam 11, the movements of the band or thread do not deflect the beam or otherwise disturb its balance.

Assuming that the thread fed onto and taken off the scale is initially of uniform thickness, the weight of the nine meters, or other predetermined length, of thread accumulated on the rollers 30, 31 balances that accumulated on the rollers 22, 23 and the beam 11 remains at rest. Since the mirror 56 also remains stationary, the reflected ray of light strikes a neutral zone 77 between the prisms 62, 63. As a result, the carriage 64 remains at rest and the recording pen 73 traces a straight line on the chart 74 as the latter is wound from roll 75 to roll 76. This straight line (which is similar to the part $a$ of the curve of Figure 4) indicates that the corresponding length of thread is of uniform thickness.

When a portion of thread of greater thickness enters the scale and passes to the rollers 22, 23 the increased weight of the nine meters continuously maintained thereon, being greater than the nine meter length on the rollers 30, 31, causes the arm 25 of the beam to be deflected downwardly and the arm 32 to be correspondingly raised. As the mirror 56 moves with the beam, the reflected ray of light $61^a$ is deflected so that it is directed against the prism 62 and eventually to the control cell 67. As a result, motor 70 operates in a direction to raise carriage 64, causing the recording pen 73 to be moved above the zero or reference line of the chart to an extent proportional to the differential existing between the weight of the thread on the rollers 22, 23 and the weight of thread on the rollers 30, 31. This differential weight, indicated by deflection of the beam, represents the increase in thickness of the thread then passing over the scale. The corresponding upwardly sloped curve traced by the pen 73 is similar to the part $b_1$ of the curve of Figure 4 and it, also, indicates the extent of the change in thickness. When compared with the base line it likewise indicates the rate of change.

As portions of thread of increased thickness pass from the accumulating rollers 22, 23 to the accumulating rollers 30, 31, the beam tends to return to its normal balanced position. As the arm 32 of the beam moves downwardly, the mirror causes the reflected ray of light $61^b$ to be directed to the prism 63 and eventually to the control cell 66. This causes motor 70 to be reversed, lowering carriage 64 and recording pen 73 so that the latter traces a downwardly sloping curve portion on chart 74 which corresponds with the part $b_2$ of the curve of Figure 4.

If the thread is of uniform increased thickness for a considerable length, the weight of the portions maintained at opposite ends of the beam balance each other and the beam 11 returns to its balanced position without the arm 32 being deflected downwardly past the balancing position. Consequently, when the carriage is moved upwardly as a result of impingement of the light ray on cell 62, the movement terminates when the neutral zone between the prisms coincides with the light ray as the recording pen reaches the zero line. Thereafter the pen traces a straight line until another change occurs in the thickness of thread passing over the scale. This straight portion of the traced curve corresponds with the part $c$ of the curve of Figure 4 and like the latter indicates that the thread is of uniform thickness, although of greater diameter than the previous portion. It should be noted that straight line parts of the traced curve represent thread portions of even thickness and do not indicate the actual thickness of the thread portion.

In the event the thicker portion of the thread is short in length, it gradually passes entirely off the rollers 22, 23 to rollers 30, 31 and is gradually accumulated in its entirety thereon. This causes the arm 32 of the beam to continue moving downwardly past the balancing position, due to the greater weight of the thread on the rollers 30, 31, as the thicker thread portion is replaced by thinner thread on the rollers 22, 23. The movement of mirror 56 causes the reflected light ray to continue to be directed to the prism 63 and to control cell 66. The continued reverse operation of motor 70 causes carriage 64 to be lowered further, moving pen 73 downwardly to trace a downwardly sloping curve portion extending below the zero line. This charted curve portion corresponds with the portion $d_1$ of the part $d$ of the curve of Figure 4 that extends below the zero line and likewise indicates decrease in thickness of the thread. This indicated decrease in thickness may represent the thread portion then passing over the scale as being of a thickness corresponding to the uniform thickness of the initial portion of the thread. Should this thread part be of lesser thickness the downwardly traced curve portion would extend further below the reference line, as at $q$ in Figure 4. As the thicker portion of thread passes from the rollers 30, 31, so that the thread lengths on both arms of the scale beam are of the same reduced thickness, the beam returns to its balanced position. As a result, the reflected light ray is deflected from prism 63 to prism 62 causing reversal of motor 70 and raising of carriage 64 so that recording pen 73 traces an upward curve to the zero line, at which point the pen comes to rest when the light ray impinges on the neutral zone 71 between the prisms as the scale beam balances. This upwardly curved part of the traced curve corresponds with the part $d_2$ of the curve of Figure 4 and likewise indicates return of the thread to a uniform thickness.

From the foregoing description it may be seen that the apparatus continuously compares the weight of equal lengths of thread at opposite arms of the scale. Thus, the deflection of the beam indicates weight differentials caused by increase or decrease of thickness in continuous portions of the thread as it passes over the scale.

It should be noted that the recording device traces a curve, similar to that of Figure 4, from which may be determined the extent of increase or decrease in thickness of the thread, the length of thread portions of increased or decreased thickness, and the rate of change of thickness. The degree of evenness of a considerable length of thread taken as a whole may be determined by integrating the curve traced on the record chart. This may be done in any suitable way, as by a planimeter, and, if desired, the planimeter may be associated with the recorder to integrate the curve as it is traced.

As an illustrative example of such an arrangement an automatic integrator for the curve traced on chart 74 is diagrammatically shown in Figure 8, and designated by the numeral 94. This integrator may comprise a conventional registering device operated by the usual wheel 95, as the latter is moved along the surfaces of a pair of appropriately arranged cones 96. The registering device and wheel 95 are carried by a member 97 connected to the recording carriage 64. Thus, the movements of wheel 95 along the cones 96 correspond with the movements of pen 73.

Cones 96 are driven in any convenient manner at a predetermined rate calculated for the particular thread, and hence for the related curve being traced upon chart 74. The reversed arrangement of cones 96 results in automatic integration of the curve values on both sides of the zero or base line as the recording pen 73 traverses the chart 74. It is to be understood, of course, that other suitable integrating devices may be employed.

It is desirable when testing threads which are of different designated diameters that the values representing evenness should be comparable. It is apparent that the same actual variation of thickness in a thin thread and in a thick thread would represent variations of different degree. For instance, a variation of 5 microns for a thread diameter of 50 microns is a change of 10%, while in a thread of 66 microns diameter it is only 7½%. Consequently, the actual differential values, determined as described above, should all be based upon variations in a thread of determined standard diameter, for example, a thread of 55 microns. Then comparable results may be obtained by applying a corrective factor corresponding to the ratio between the diameter of the determined standard and the diameter of the thread being tested. Thus, when testing threads of 51 or 70 microns, respectively, comparable results are obtainable by applying the factor 55/51 or 55/70 to the values obtained with the apparatus.

If desired, the beam of the weighing device may be arranged to operate a pointer over a suitably graduated scale so that variations in thread thickness may be observed by noting the deflection of the pointer in response to the differential existing between the weights of equal lengths of thread continuously maintained on the arms of the scale. An alternative construction is illustrated in Figures 9 and 10 in which the weighing device is provided on only one arm 80 with pairs of rollers 81 for accumulating and maintaining a determined length of thread thereon. In this case the pointer 82 on the arm 83 is deflected in accordance with the actual weight of the length of thread. Differences in weight between portions of thread might be read directly by providing the reading scale 84 with an auxiliary graduated scale 85 adapted to be adjusted so that its zero graduation coincides with the indicated weight of the initial length of thread. By providing such a thread weighing scale with a mirror to control the recording device illustrated in Figure 8, a weight curve similar to Figure 3 would be produced.

Another alternative construction is illustrated in Figures 11 and 12. The arm 90 of the weighing scale is adapted to have a weight 91 placed thereon which corresponds to the weight of the determined length in a thread of a standard diameter and normally balances the thread length accumulated on rollers carried by the other arm, as 80 in Figures 9 and 10. In this case the differentials in weight indicated by pointer 82 on scale 93 as a result of deflection of the beam would represent differences in weight between the weight of the determined length of thread of a predetermined standard thickness and the actual weight of a similar length of thread passing over the scale. In this respect the differential indications obtained would be relative to a standard, rather than represent differential weight between equal lengths of a continuous thread on opposite arms of the weighing device as in Figures 5 to 8.

I claim:

1. An apparatus for determining differences in thickness in portions of thread or the like, comprising means for simultaneously supporting successive portions of equal length of an unbroken thread, means for comparing the weights of said portions, and means controlled by said comparing means for indicating variations in weight of said portions.

2. Apparatus for determining variation in thickness in portions of a thread or the like, comprising a weighing scale having a weighing arm oscillatable about a fulcrum; means on said arm positioned outwardly of said fulcrum for retaining a determined length of thread thereon; means for continuously feeding an unbroken thread to and taking it away from said retaining means, variations in the weight of thread positioned on said arm causing deflection thereof in accordance with the variation in weight of successive portions of said thread; and thread guide means positioned adjacent the fulcrum of said arm for feeding thread to and discharging it from said arm along lines coinciding with the axis of oscillation of said arm to prevent deflection thereof due to forces incidental to the movement of said thread.

3. Apparatus for determining differences in thickness in portions of a thread or the like, comprising a weighing scale having a double armed weighing beam oscillatable about a fulcrum intermediate the ends thereof; means for accumulating equal lengths of said unbroken thread in normally balancing relation on said beam at opposite sides of the axis of oscillation thereof; and means for continuously feeding an unbroken thread to and taking it away from said beam, variations in the weight of the equal thread lengths transiently retained at opposite sides of the axis of oscillation of said beam causing deflection of the latter in accordance with the differential in weight.

4. Apparatus for determining differences in thickness in portions of a thread or the like, comprising a weighing scale having a double armed weighing beam oscillatable about a fulcrum intermediate the ends thereof; means for continuously feeding an unbroken thread to said beam and taking it away therefrom; and means for distributing said thread on said beam in portions of equal length on each arm thereof, variations in the thickness of the thread portions of equal length on said arms causing deflection of said beam in accordance with the weight differential between said thread portions.

5. Apparatus for determining differences in thickness in portions of a thread or the like, comprising a weighing scale having a double armed weighing beam oscillatable about a fulcrum intermediate the ends thereof; a plurality of thread holding means correspondingly located on each arm of said beam and adapted to retain equal lengths of an unbroken thread in normally balancing relation at opposite sides of the axis of oscillation of said beam; thread supply means; thread take-up means; means for guiding an unbroken length of thread from said supply means to the thread holding means on one arm of said beam, thence to the thread holding means on the other arm thereof and from the latter to said take-up means; and means for operating said take-up means to continuously feed thread to and take it up from said thread holding means, variation in the weight of the thread causing deflection of said beam in proportion to the differential in weight between the equal lengths of thread retained by the thread holding means on the respective arms of said beam.

6. Apparatus for determining differences in thickness of portions of a thread or the like, comprising a weighing scale having a double armed weighing beam oscillatable about a fulcrum intermediate the ends thereof; a plurality of thread rollers correspondingly located on each arm of said beam and adapted to retain equal lengths of an unbroken thread in normally balancing relation at opposite sides of the axis of oscillation of said beam; guide means for introducing thread to said beam along its axis of oscillation and directing the thread to the rollers on one of said arms; means for directing the thread from the rollers on said arm of the beam to the rollers on its other arm; guide means for directing thread from said last rollers and discharging it from said beam along its axis of oscillation; and means for continuously feeding thread to the rollers on said one arm and taking it up from the rollers on the other arm, variation in the weight of thread portions maintained on the rollers on the respective arms of the scale causing deflection of said beam in accordance with the differential between the weights of said thread portions.

7. Apparatus for determining differences in thickness of portions of a thread or the like, comprising a weighing scale having a double armed weighing beam oscillatable about a fulcrum intermediate the ends thereof; a plurality of rollers correspondingly located on each arm of said beam and adapted to retain equal lengths of an unbroken thread in normally balancing relation at opposite sides of the axis of oscillation of said beam; thread supply means, thread take-up means, means for guiding an unbroken length of thread from said supply means to the rollers on one arm of said beam, thence to the rollers on the other arm thereof and from the latter to said take-up means; means for operating said supply and take-up means to continuously feed thread to and take it up from said rollers, variation in the weight of the thread causing deflection of said beam in proportion to the differential in weight between the equal lengths of thread retained by the rollers on the respective arms of said beam; and means for driving said thread retaining rollers.

8. Apparatus for determining differences in thickness in portions of thread or the like comprising; means for simultaneously supporting successive portions of equal length of an unbroken thread; means for comparing the weights of said portions and means controlled by said comparing means and responsive to differentials existing between the weights of said compared thread portions for indicating variation in the thickness of said portions.

9. Apparatus for determining differences in thickness in portions of thread or the like comprising; a weighing beam oscillatable about a fulcrum located intermediate the ends thereof; and means positioned on said beam in normally balancing relation at opposite sides of its fulcrum for retaining equal lengths of a continuous thread thereon whereby the weights of the equal lengths of thread are compared to determine the differential between said weights as indicated by deflection of said beam.

10. Apparatus for determining differences in thickness in portions of thread or the like comprising; a weighing beam oscillatable about a fulcrum located intermediate the ends thereof; means positioned on said beam in normally balancing relation at opposite sides of its fulcrum for retaining equal lengths of a continuous thread thereon whereby the weights of the equal lengths of thread are compared to determine the differential between said weights as indicated by deflection of said beam; means for continuously feeding an unbroken thread to and withdrawing it from said retaining means on said beam; and means controlled by said beam and responsive to deflection thereof for indicating variations in thickness of the thread portions transiently retained on said retaining means.

11. Apparatus for determining the evenness of portions of a continuous thread or the like comprising; means for supporting successive portions of equal length of a continuous thread, means for simultaneously weighing said portions to determine the weight differentials between said portions; and means operable by said weighing means and responsive thereto for recording said differential weights in the form of a charted curve representing the extent and rate of change in thickness between continuous portions of said thread.

HANS P. LUHN.